(12) United States Patent
Hein

(10) Patent No.: US 7,050,300 B2
(45) Date of Patent: May 23, 2006

(54) COOLING AIR GUIDE

(75) Inventor: Holger Hein, Augsburg (DE)

(73) Assignee: Fujitsu Siemens Computers GmbH, Munich (DE)

( * ) Notice: Subject to any disclaimer, the term of this patent is extended or adjusted under 35 U.S.C. 154(b) by 0 days.

(21) Appl. No.: 10/747,708

(22) Filed: Dec. 29, 2003

(65) Prior Publication Data

US 2004/0136159 A1 Jul. 15, 2004

Related U.S. Application Data

(63) Continuation of application No. PCT/DE02/02154, filed on Jun. 12, 2002.

(30) Foreign Application Priority Data

Jun. 28, 2001 (DE) ................. 101 31 368

(51) Int. Cl.
*H05K 7/20* (2006.01)
(52) U.S. Cl. ............ 361/695; 165/80.3; 165/122; 454/184
(58) Field of Classification Search .......... 165/80.2, 165/80.3, 121, 122; 361/687, 690, 694–695; 454/184

See application file for complete search history.

(56) References Cited

U.S. PATENT DOCUMENTS

| 5,297,005 | A | 3/1994 | Gourdine |
| 5,497,825 | A | 3/1996 | Yu |
| 5,630,469 | A | 5/1997 | Butterbaugh et al. |
| 5,917,697 | A | 6/1999 | Wang |
| 6,094,346 | A | 7/2000 | Schweers et al. |
| 6,113,485 | A | 9/2000 | Marquis et al. |
| 6,145,586 | A | 11/2000 | Lo |
| 6,148,907 | A | 11/2000 | Cheng |
| 6,587,335 | B1 * | 7/2003 | Nelson et al. ............... 361/687 |

FOREIGN PATENT DOCUMENTS

DE 40 35 213 A1 5/1992

* cited by examiner

*Primary Examiner*—Gregory D Thompson
(74) *Attorney, Agent, or Firm*—Laurence A. Greenberg; Werner H. Stemer; Ralph E. Locher

(57) ABSTRACT

A cooling air guide is disposed in a computer for cooling a heat-generating component, such as, for example, a processor. The cooling air guide has a connecting part through which cooling air enters, and a hood that is U-shaped in cross section and can be placed over the component to be cooled and through which the cooling air is conducted from the connecting part to the cooling component. In order to be able to use the hood for different types of processor and different processor positions on the motherboard and to compensate for tolerances, the hood is fastened, according to the invention, moveably to the connecting part.

11 Claims, 3 Drawing Sheets

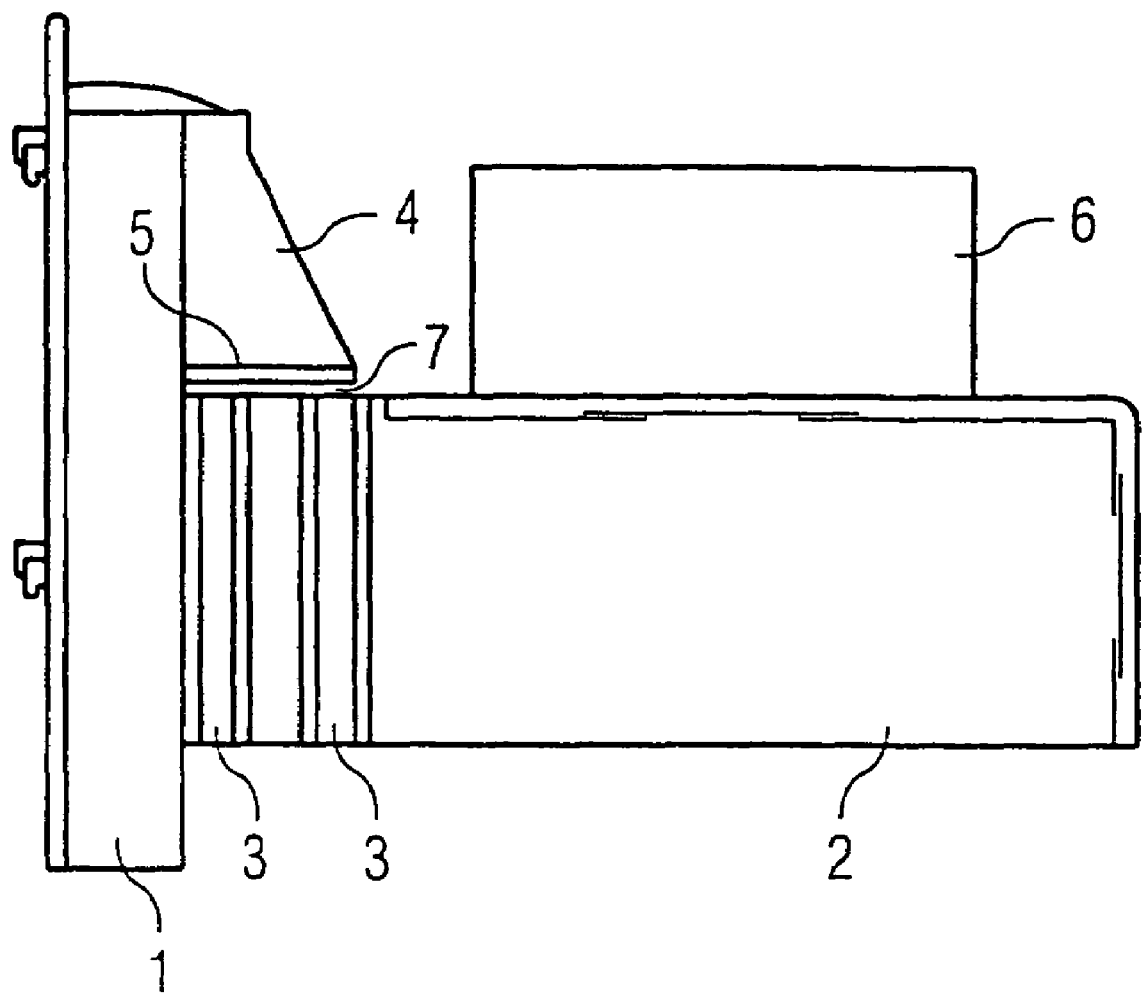

COOLING AIR GUIDE

CROSS-REFERENCE TO RELATED APPLICATION

This application is a continuation of copending International Application No. PCT/DE02/02154, filed Jun. 12, 2002, which designated the United States and was not published in English.

BACKGROUND OF THE INVENTION

Field of the Invention

The invention relates to a cooling air guide in a computer for cooling a heat-generating component, such as, for example, a processor. The cooling air guide has a connecting part, through which the cooling air enters, and a hood that is U-shaped in cross section and can be placed over the component to be cooled and which conducts the cooling air from the connecting part to the cooling component.

A wide variety of such cooling air guides and cooling hoods or cooling scoops are known from the prior art. They are used, in particular, in order to cool the processor or processors on the motherboard.

Since the processors differ in size and occupy a variable position on the motherboard, use has been made up to now either of a number of special air guides up to now or of a large, rigid air guide which covers all of the processors and all processor positions. However, the large, rigid air guide has the disadvantage of ensuring, due to the large cross section, that cooling is substantially less efficient than if the width of the cooling air guide is matched to the width of the processors.

Since the processors are becoming ever more powerful and therefore the power consumption, and hence also the emission of heat, are becoming ever greater, a change was made to creating a dedicated, fixed cooling air guide for each type of processor.

SUMMARY OF THE INVENTION

It is accordingly an object of the invention to provide a cooling air guide that overcomes the above-mentioned disadvantages of the prior art devices of this general type, which can be used for a multiplicity of types of processor and for a variable positioning of the types of processor without the width of the hood having to be increased to an inefficient width.

With the foregoing and other objects in view there is provided, in accordance with the invention, a cooling air guide for cooling a heat-generating component of a computer.

The cooling air guide contains a connecting part through which cooling air enters, and a hood having a U-shaped cross section and can be placed over the component to be cooled. The hood conducts the cooling air from the connecting part to the component. The hood is fastened moveably to the connecting part.

The object is achieved according to the invention by the hood being fastened moveably to the connecting part.

This flexible fastening enables the hood to be displaced relative to the connecting part and to be positioned precisely over the processor.

In order to obtain high cooling efficiency, the hood is matched in width with only a small excess size to the width of the component to be cooled.

The hood is preferably only moveable laterally with respect to the connecting part and, for this purpose, the hood is fastened to the connecting part via film hinges. At least two parallel film hinges are preferably provided on both sides, thus making it possible for the hood to be moved laterally by the film hinges.

In order to obtain a seal for the hood in the region above the film hinges, according to one variant a plate is advantageously formed on the connecting part in this region, the plate being positioned at only a small distance above the film hinges and also protruding laterally over the film hinges. Therefore, virtually no air exits it upward, even when the hood moves laterally, since this is prevented by the plate.

An alternative variant embodiment makes provision for an air supply duct to be provided above the film hinges and for tabs to be disposed to the side of the air supply duct, the tabs likewise preventing the air from exiting upward when the hood moves laterally.

According to one preferred embodiment, the hood is closed on the end side and the connecting part is configured for connecting to a fan.

A further variant makes provision for the hood to have an additional connection for a cooling air hose for supplying fresh air.

Other features which are considered as characteristic for the invention are set forth in the appended claims.

Although the invention is illustrated and described herein as embodied in a cooling air guide, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a side-elevational view of the cooling air guide.

DESCRIPTION OF THE PREFERRED EMBODIMENTS

Figure 1:
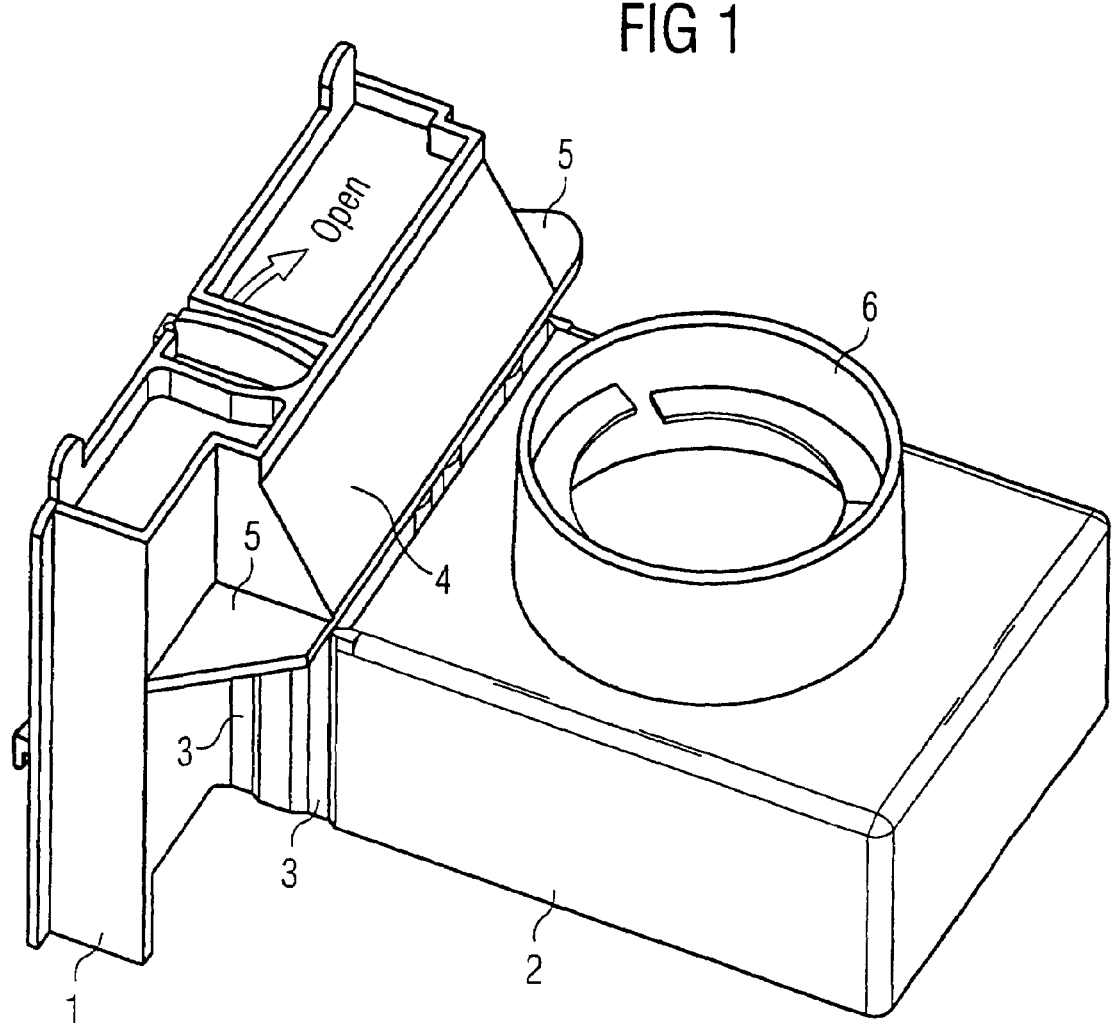
FIG. 1 is a diagrammatic, top perspective view of a cooling air guide.

Referring now to the figures of the drawing in detail and first, particularly, to FIG. 1 thereof, there is shown a cooling air guide according to the invention in a perspective view from above. The cooling air guide has a connecting part 1 which is configured, in particular, for connecting to a fan in the wall of a computer or to a fan on the power unit of a computer.

Adjoining the connecting part 1 is a hood 2 that is placed over the component that is to be cooled on the computer. The width of the hood 2 is matched to the width of the component to be cooled, so that the hood can be placed with only a small excess size over the component to be cooled. The hood 2 has a U-shaped cross section and is closed on the end side.

The hood 2 is fastened on both sides to the connecting part 1 via two hinges 3 being film hinges, flexible hinges, movable hinges and/or accordion type hinges 3.

The hood 2 is open in the region above the film hinges 3. In this region, the connecting part 1 either has a non-illustrated continuous plate or, as illustrated in FIG. 1, an air supply duct 4 formed above the hood 2 between the two film hinges 3. Tabs 5 are provided to the side of the air supply duct 5, so that the cooling air cannot escape upward to the side of the air guide duct 4 when the hood 2 moves laterally.

To increase the cooling, the hood 2 also has a further cooling air connection 6 in which, for example, a cooling air hose for supplying fresh air from the surroundings of the computer can be closed.

Figure 2:
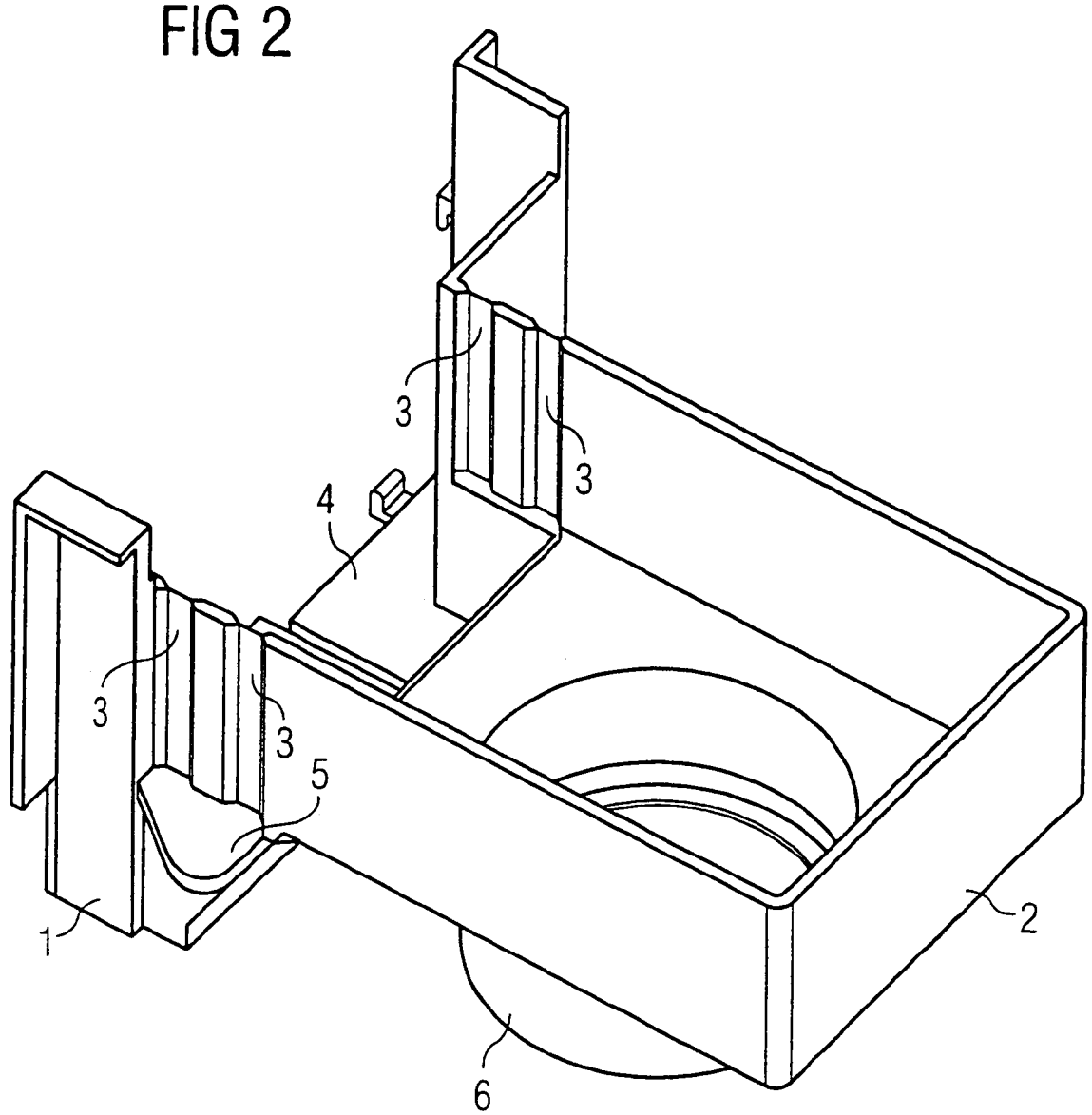
FIG. 2 is a bottom, perspective view of the cooling air guide.

FIG. 2 shows the cooling air guide according to FIG. 1 in a perspective view from below.

The U-shaped cross section of the hood 2 can readily be seen in FIG. 2.

The manner in which the cooling air is introduced above the film hinges 3 into the hood 2 via the air duct 4 between the tabs 5 can furthermore readily be seen.

FIG. 3 shows the cooling air guide according to the invention in a side view.

The tabs 5 are disposed above the film hinges 3 spaced apart from them via a gap 7. The gap 7 is dimensioned to be as small as possible, so that the hood 2 can be moved laterally with respect to the connecting part 1 by the film hinges 3, which run in parallel, but as little cooling air as possible exits in this region.

The invention is not restricted to the exemplary embodiment illustrated, it being possible, for example, also to provide more than two film hinges 3 running in parallel.

I claim:

1. In a computer, a cooling air guide for cooling a heat-generating component of the computer, the cooling air guide comprising:
   a connecting part through which cooling air enters; at least one hinge; and
   a hood being connected to said connecting part by said at least one hinge, said hood having a U-shaped cross section and can be placed over the component to be cooled, said hood conducting the cooling air from said connecting part to the component, said hood being fastened moveably to said connecting part.

2. The cooling air guide according to claim 1, wherein said hood is matched in width with an excess size to the component to be cooled.

3. The cooling air guide according to claim 1, wherein said hood is fastened in a laterally moveable manner to said connecting part.

4. The cooling air guide according to claim 1, wherein said at least one hinge is a plurality of film hinges fastening said hood to said connecting part.

5. The cooling air guide according to claim 4, wherein said film hinges are at least two parallel film hinges disposed on both sides between said hood and said connecting part.

6. The cooling air guide according to claim 4, further comprising tabs disposed on said connecting part above and to a side of said film hinges, said tabs substantially preventing the cooling air from exiting upward in this region, even when said hood moves laterally.

7. The cooling air guide according to claim 4, wherein said connecting part has:
   an air duct in a region above said film hinges; and
   tabs disposed to a side of said air duct, said tabs largely preventing the cooling air from exiting to said side of said air duct when said hood moves laterally.

8. The cooling air guide according to claim 1, wherein said hood is closed on an end side.

9. The cooling air guide according to claim 1, wherein said hood has a connection for receiving an additional cooling air hose.

10. The cooling air guide according to claim 1, wherein said connecting part is configured for connecting to a fan.

11. The cooling air guide according to claim 1, wherein the heat-generating component is a processor.

* * * * *